Aug. 17, 1954 V. E. MURRAY 2,686,437
TWO-SPEED DIRECT DRIVE REAR AXLE
Filed Feb. 5, 1952 2 Sheets-Sheet 1
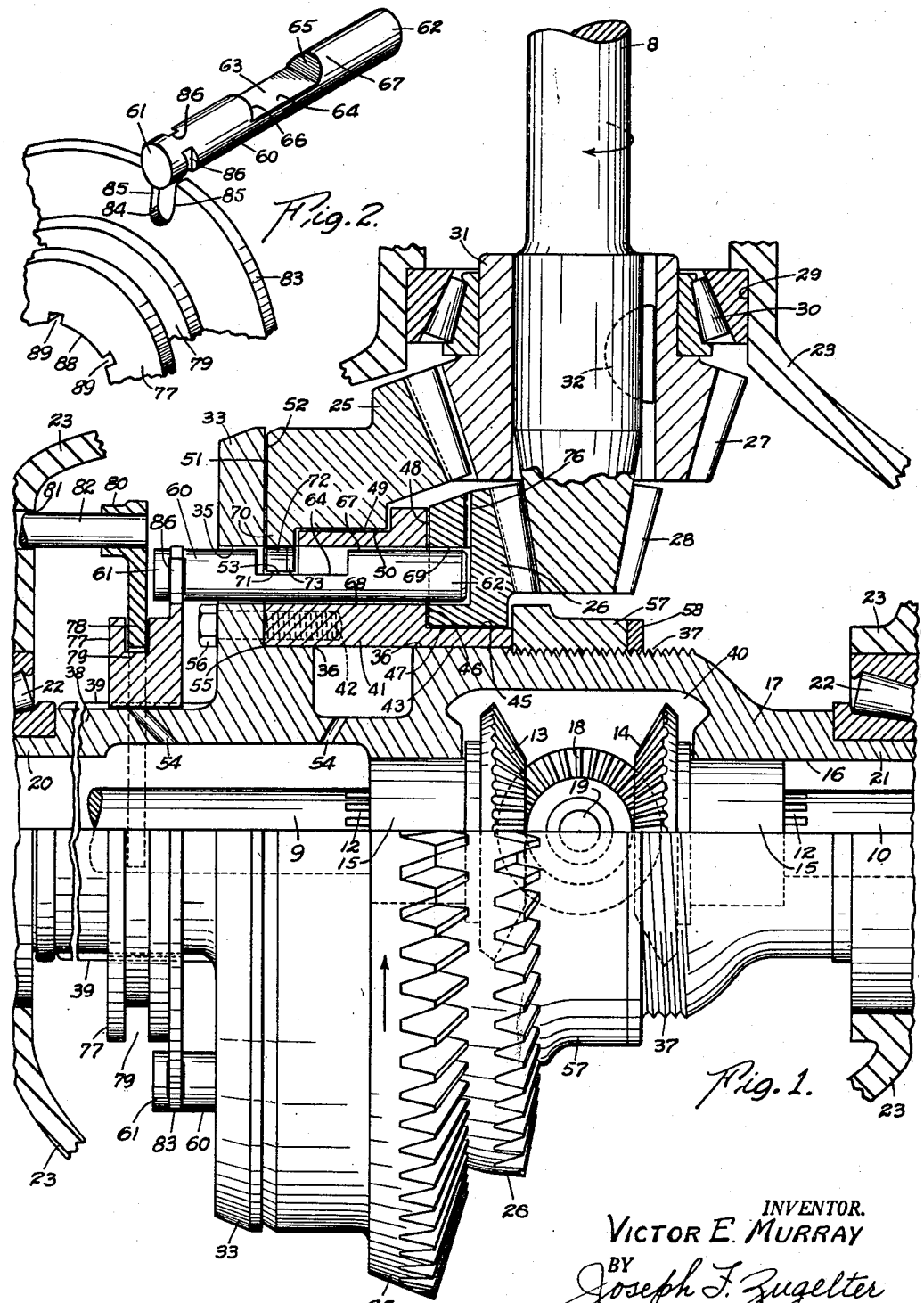

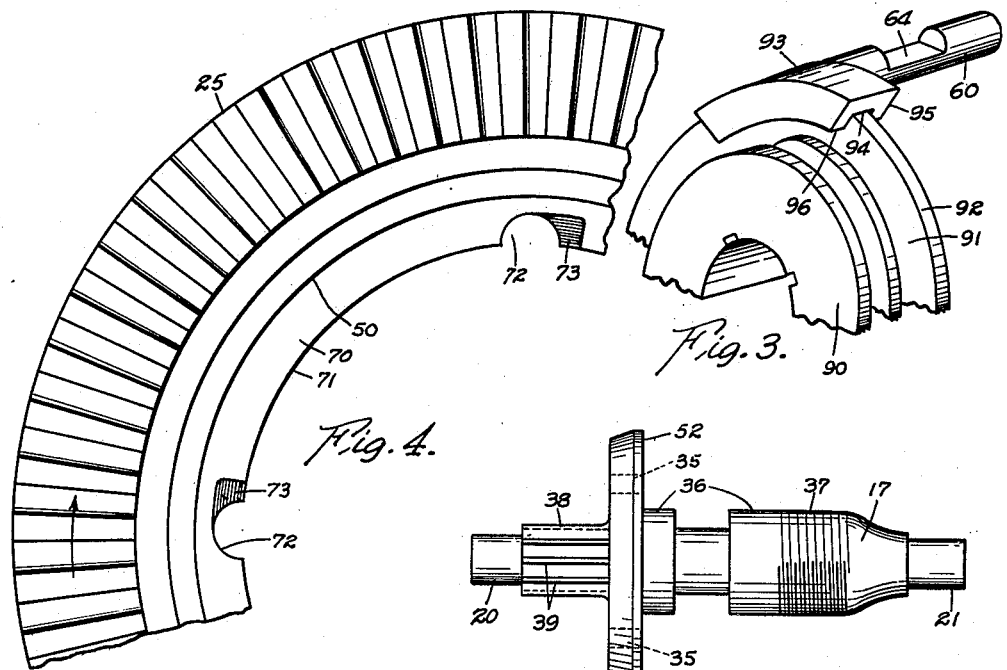

Patented Aug. 17, 1954

2,686,437

UNITED STATES PATENT OFFICE 2,686,437

TWO-SPEED DIRECT DRIVE REAR AXLE

Victor E. Murray, Cincinnati, Ohio

Application February 5, 1952, Serial No. 269,977

14 Claims. (Cl. 74—701)

The present invention relates to a two-speed direct drive rear axle, such as might be employed in the propulsion of automotive vehicles, whether such vehicles are road vehicles or track vehicles.

An object of the invention is to provide a drive axle assembly of the multiple speed type, which is simple and practical for gaining the advantages of changing the gear ratio at the axle, such advantages to be referred to hereinafter.

Another object is to provide a two-speed direct drive axle assembly in which the number of moving parts is reduced to a practical minimum, and in which special attention has been devoted to minimizing wear, noise, and loss of power in the gearing.

Another object is to simplify assembly and reduce the cost of manufacture of a device of the character stated, while at the same time providing for great durability and serviceability heretofore unattainable in multiple speed drive axles.

Another object of the invention is to provide a device of the character stated which is unitary and compact, so that any necessary repairs or replacements resulting from abuse or lack of lubricant may be effected without the expenditure of excessive time and labor; and by reason of the compactness of the assembly, the gearing and the controls therefor may be encased in a housing comparable in size and weight to conventional differential housings presently in use.

A further object is to provide a two-speed drive axle assembly in which the gears are maintained always in proper mesh, and the change of driving ratio is accomplished instantly and with ease through the intermediary of light-weight easily shiftable parts which are highly wear-resistant.

Additional objects are: to apply the invention to motor vehicles for the purpose of conserving fuel and lubricant; to minimize wear and repairs on the engine and other vital parts by reducing their normal operating speed; to reduce injurious vibration attending high speed movement of parts, while at the same time enhancing the riding qualities of the vehicle.

These and other objects are attained by the means described herein and illustrated upon the accompanying drawings, in which:

Fig. 1 is a cross-sectional view with certain parts shown in elevation, illustrating a propeller shaft and two aligned axle shafts placed in driving relationship in accordance with the present invention.

Fig. 2 is a fragmentary perspective view showing a gear locking and releasing mechanism which forms part of the present invention.

Fig. 3 is a view similar to Fig. 2, showing a modification.

Fig. 4 is a fragmentary plan view of a high speed ring gear.

Fig. 5 is a fragmentary plan view of a lower speed ring gear.

Fig. 6 is a side elevational view, on a reduced scale, of the differential or spider gear housing illustrated upon Fig. 1.

Fig. 7 is a view similar to Fig. 5, showing a modified form of differential or spider gear housing which may be employed in practicing the invention.

Fig. 8 is a fragmentary end view of a ring gear journal member.

It is a well known fact that automotive vehicles are provided with ring gears and driving pinions therefor which may differ as to driving ratio, depending upon the topography of the territory in which the vehicle is expected to travel. The selection of a proper permanent gear ratio in any given case is most difficult, due to lack of knowledge as to where the vehicle will ultimately or principally be used. If a vehicle is equipped with low ratio rear axle gears, and is used principally in flat terrain, its performance will be uneconomical and therefore unsatisfactory. Likewise, unsatisfactory performance results from the use of high ratio gears in hill country, because of a lack of needed power at the rear or driving wheels.

From the foregoing, it should be evident that the ideal arrangement would be attained by making it possible for the operator of the vehicle to select the gear ratio needed under differing driving conditions, as such conditions change. This is one of the objectives of the present invention.

Important advantages are realized by changing the gear ratio at the rear axle, or at the ring and pinion gears, rather than in the change speed gear train commonly referred to as the transmission gear, which couples the propeller shaft to the engine crank shaft. By changing the gear ratio at the rear axle, it is possible to obtain a direct drive for either ratio selected, thereby to avoid the loss of power, the wear, and the noise, incident to use of one or more intermediate gears. The direct drive, moreover, is more reliable and serviceable than one which employs intermediate gearing, and its use results in economical and trouble-free operation of the vehicle. Another important advantage of the direct drive, is that of maintaining mechanical connection between the engine and the driving wheels, so that the braking action of the engine is available on down grades. Other advantages of a direct drive will be appreciated by the skilled engineer, and need not be more fully set forth herein.

Referring now to the accompanying drawings, 8 indicates a propeller shaft transmitting rotary motion from an engine or motor, to the gearing which drives the axles 9 and 10 of a vehicle. Ordinarily, there is some form of clutch and change speed gear box interposed between the motor and the propeller shaft, whereby proper control over rotation of the propeller shaft is exercised by the vehicle operator. Since the clutch and change speed gear box form no part of the present invention, these are not shown upon the drawings; however, it may be observed incidently that if the change speed gear box furnishes the vehicle with three forward speeds and one reverse, use of the two-speed rear axle of the invention upon such vehicle will double the number of forward and reverse speeds. That is, there will be six speeds forward, and two reverse, in the example mentioned.

The axles 9 and 10, as usual, are in alignment and may have splined inner ends 12 drivingly fitted to the spider gears 13 and 14, which gears are supported in suitable bearings 15—15. The bearings 15—15 are mounted within the axial bore 16 of the body 17, which body is usually a metal casting and known as a differential gear housing. A third spider gear 18 is in constant mesh with the spider gears 13 and 14, and may rotate upon a stud 19 disposed transversely of the housing 17, whenever differential rotation of the axles occurs. Usually, the differential gearing includes a plurality of gears such as 18, but all such gears perform the same function of transmitting relative rotation from one axle to the other. The function and performance of the spider or differential gears are well known, and therefore need not be explained here in greater detail.

It may be noted that the differential gear housing 17 is a rotary part, and is therefore supported at its opposite ends 20 and 21 by means of any suitable anti-friction bearings 22 carried by the main housing, the latter being indicated at several points upon the drawing by the reference character 23. The main housing, as is customary, forms a lubricant reservoir for all the gearing of the rear axle, and carries the axle housings and braking mechanism for the vehicle.

The driving means for the axles 9 and 10 includes a pair of ring gears 25 and 26, in constant mesh with the driving pinions 27 and 28, respectively. The ring gears are adapted for selective fixation to the differential housing 17 in a manner to be later described in detail. The pinions 27 and 28 are fixed upon the propeller shaft 8, and extend into the main housing 23 through a bore 29 which supports an anti-friction bearing 30. The bearing in turn supports the propeller shaft, either directly, or indirectly as shown, to maintain a proper meshing of the pinions with the ring gears. In the example illustrated, the bearing 30 supports the hub 31 of pinion 27, which hub may be keyed as at 32 upon the propeller shaft. Pinion 28 may be integral with the propeller shaft end as shown, or it may be separate part suitably fixed to said shaft. The details of the mountings for the pinions upon the propeller shaft, and the manner of journalling the shaft upon the main housing at 30, are of minor concern to the present invention and may therefore follow accepted practice in the art. It should be understood, however, that both pinions 27 and 28 rotate always with the propeller shaft, and are not shiftable thereon; nor is the propeller shaft shiftable either longitudinally or laterally relative to the ring gears.

In the embodiment illustrated by Figs. 1 and 6 of the drawings, the differential gear housing 17 is provided with a fixed or integral flange 33 provided with a plurality of lateral bores 35 extending in the general direction of the housing axis, and to one side of the flange is a bearing area 36, beyond which is an externally threaded area 37. At the opposite side of flange 33 is a hub 38, which preferably though not necessarily, is provided with longitudinal splines 39. The housing 17 is hollow, as shown in Fig. 1, and includes a chamber 40 accommodating the differential gears 13, 14 and 18. Any known method may be employed for lubricating said gears and the bearings adjacent thereto.

A ring gear journal member 41, Fig. 1, which may be in the form of a stepped annular collar or sleeve, fits snugly over the bearing area 36 of the gear housing 17 and is held fast to the housing 17 in any suitable manner, as by means of screws or other fasteners anchored in the threaded bores 42. It is found convenient to screw fasten the journal member 41 to the flange 33 as shown, although the desired fixation of the journal member may be effected in other ways, for example, as shown in Fig. 7 to be described. The journal member preferably is formed from a bearing metal such as brass or bronze, to resist wear and reduce friction losses.

The journal member 41, as will be understood, is in the form of a ring or collar having a central enlarged bore 43 into which fits the bearing area 36 of the differential gear housing, and at one end of the journal member is a reduced annular bearing area 45 flanked by a thrust area or face 46 for the ring gear 26. The ring gear 26 has a central bore 47 which has a running fit on the bearing area 45 of the journal member. The back face 48 of said gear will at times slide upon the thrust area 46 of the journal member, while the gear is being driven by the propeller shaft pinion 28. To distinguish the ring gears from one another, gear 26 may be referred to as the inner ring gear, whereas gear 25 is termed the outer ring gear.

That end of the journal member 41 which is opposite to the bearing area 45, is turned to provide an annular bearing area 49 for the outer ring gear 25, said gear having a central bore 50 providing for a running fit upon the bearing area 49. The back face 51 of this ring gear 25 exerts its thrust upon the flange 33, and will at times slide upon the face 52 of the flange, as will be explained hereinafter. The journal member has a final annular step 53, which is best shown upon Fig. 8, providing an end face 55 which abuts firmly the face 52 of flange 33 under the force imposed by screw 56. The journal member may be further retained and fixed in position upon the differential gear housing, by means of the large nut 57 which threadedly engages the screw portion 37 of the housing. This nut 57 serves also to hold the inner ring gear in place upon the journal member for convenience in assembly, and if desired, a second nut 58 or other form of retainer may be applied for locking the nut 57 against accidental displacement.

From the foregoing, it will be understood that the journal member provides for individual mounting of both ring gears 25 and 26 axially upon the differential housing, with the gears constantly in mesh with the driving pinions 27 and 28. The thrust imposed upon the ring gears by the pinions, is transmitted to the large thrust areas 46 and 52, which ensure true rotation of the ring gears in their respective planes and eliminate the possibility of undue wear at the bearing bores of the ring gears.

It may here be noted that an identical disposition of the ring gears upon the differential gear housing may be achieved with the use of the modified housing structure of Fig. 7, wherein the various bearing areas and thrust areas are formed directly upon the housing by means of a turning operation. In this case, the bearing area and the thrust area for the inner ring gear are indicated at 345 and 346, respectively, while those for the outer ring gear are indicated at 349 and 352. Since these various portions are integral parts of the housing in Fig. 7, it is necessary for assembly purposes to make the flange 333 a separate part, to be fastened onto the housing by means of screws or the like 356. The bores 335 correspond to the bores 35 of Fig. 6, and these will be referred to presently.

Reverting now to Fig. 1, it is pointed out that means are provided for selectively locking either ring gear 25 or 26 to the differential gear housing 17, so as to complete the drive from the propeller shaft to the axles 9 and 10, at the will of the operator. If the outer ring gear 25 be locked to housing 17, while permitting the inner ring gear 26 to idle about the housing, there will be obtained a certain speed of the axles which is different than the axle speed obtained by completing the drive through the inner ring gear 26. In the example illustrated, the drive through the outer ring gear will produce a higher axle speed than will the drive through the inner ring gear, at the same speed of the propeller shaft. Whenever one ring gear is locked to housing 17, the other ring gear idles upon the housing notwithstanding the fact that both gears remain in mesh with their respective drive pinions 27 and 28.

The means employed for selectively locking the ring gears 25 and 26 to the differential housing 17, may comprise one or more longitudinally shiftable plungers 60, shiftability of which preferably is under the control of the vehicle operator. The number of plungers employed is a matter of choice or judicious selection, but for simplification of the present disclosure the number of plungers is limited to two, and since they are identical in structure and function, a description of one will suffice.

The plunger may consist of an elongate rod or bar 60 having a head or outer end 61, a forward bolt portion or nose end 62, and an intermediate recessed portion or notch 63. The head end is adapted for attachment to an actuator, whereby the operator of the vehicle may cause the plunger to be shifted longitudinally, within certain limits. The notch 63 provides a depressed face 64 which may include the axis of the plunger, or nearly so, this face being defined by the opposed notch walls 65 aned 66. Adjacent to the wall 65 is a second bolt portion 67, constituted of the full-round portion of the plunger which is immediately in advance of the notch.

The plunger projects through the bore 35 in flange 33, and through a bore 68 of the journal member 41, these bores being held in alignment by the screw 56. The forward bolt portion 62 of the plunger can be advanced into or withdrawn from a transverse bore 69 formed in the back of the inner ring gear 26. When the plunger is advanced as illustrated by Fig. 1, a driving connection is established between the inner ring gear 26 and the journal member 41, so that rotation of the propeller shaft will be translated through pinion 28, ring gear 26, journal member 41, and differential housing 17, to drive the axles 9 and 10. If the plunger be retracted sufficiently to displace the bolt end 62 thereof from the bore 69, the driving connection aforesaid will be broken or disengaged, leaving the ring gear 26 free to rotate upon its bearing 45.

Attention is now directed to the outer ring gear 25, which as shown upon Figs. 1 and 4, includes an inwardly directed flange 70 at the back of the gear, between the thrust face 51 and bearing area 50, which flange 70 has an inner edge 71 provided with a series of half-round notches or recesses 72 open toward the center of the gear. The number of notches or recesses 72 may equal the number of plungers provided, and they should be so spaced upon the gear as to accommodate all of the plungers simultaneously. By referring to Fig. 1, it is evident that shifting of the plunger 60 to the left a proper distance, will result in lodging the plunger bolt portion 67 within the notch or recess 72 of the outer ring gear 25, thereby to establish through the plunger a driving connection between said ring gear 25 and the journal member 41 in which the plunger is embraced. Thus, a driving connection is established which translates rotary motion of the propeller shaft 8 through the driving pinion 27, outer ring gear 25, journal member 41, and differential housing 17, to the axles 9 and 10. This is the high speed drive.

It should be noted that the intermediate bolt portion 67 of the plunger is disengaged from the recess 72 of the outer ring gear whenever the forward bolt portion 62 of the plunger is in engagement with the bore or recess 69 of the inner ring gear. Likewise, whenever the intermediate bolt portion 67 is engaged with the recess 72 of the outer ring gear, the forward bolt portion 62 of the plunger is fully withdrawn from the bore or recess 69 of the inner ring gear. Because of this relationship of the parts, it is never possible to establish a drive through both ring gears at the same time, and thereby damage the mechanism. Otherwise stated, the distance between the bolt portions 67 and 60 of the plunger is gauged to avoid simultaneous locking of the ring gears to the differential gear housing, and in fact, such distance preferably is so gauged as to provide a neutral position of the plunger at which neither bolt portion engages a ring gear recess. Thus, the drive from the propeller shaft to the axles may be disengaged completely, by disposing the plunger to a position intermediate its fully advanced and fully retracted limits.

To facilitate engagement of the bolt portions of the plunger with their respective ring gears, the ring gears may be provided with lead-in inclines adjacent to their recesses 69 and 72. In the case of the outer ring gear 25, the lead-in incline indicated at 73 is formed in the flange 70, and slightly exceeds, in width, half the diameter of the plunger. This incline properly is in advance of the recess 72 as the gear 25 normally rotates.

In the case of the inner ring gear 26, Fig. 5, the lead-in incline 75 trails the recess or bore 69 under the normal direction of gear rotation, and it is for this reason that the incline 75 does not appear upon Fig. 1. Incline 75 slightly exceeds in width the diameter of the plunger, and is located on the back of the ring gear 26.

The character 76 indicates a vent or relief passage for suction and pressure generated in the blind hole or bore 69, as the plunger is advanced and retracted therein. As will be understood, the presence of grease or heavy lubricant in the hole 69 might render difficult the advancement and retraction of the plunger end 62 within the hole, unless some form of relief is provided. As is obvious, provision of the passage or bore 76 constitutes but one of several possible solutions to the problem. As an alternative, for example, the hole or bore 69 might be drilled through the gear to the base of the gear teeth; or the plunger might be channeled or drilled longitudinally to obtain the relief desired. It may be noted, however, that the provision of a relief passage such as 76 which extends radially of the gear, utilizes the power of centrifugal force to keep the bore cleared of any substantial quantity of heavy lubricant which might otherwise interfere with shifting of the plunger.

With further reference to the outer ring gear 25 and plunger 60, it should be noted that the flange edge 71 of the ring gear rides freely across the face 64 of the plunger notch 63, whenever the plunger is fully advanced to engage the other ring gear 26. This relationship appears in Fig. 1. Similarly, this over-riding relationship occurs when the plunger is partially retracted to the extent that the forward bolt portion 62 is flush with the thrust face 46 of the journal member 41, at which time both ring gears idle on the journal member. Upon further retraction of the plunger, the intermediate bolt section 67 of the plunger enters the outer ring gear notch 72 and locks said ring gear to the differential housing, while the inner ring gear idles upon the housing, though driven by the pinion 28.

From the foregoing, it is evident that regardless of which ring gear is engaged in driving the vehicle, the drive is direct and positive. That ring gear which is performing no useful work while the other is driving, consumes very little of the engine horsepower because its speed is not great and it rotates more or less with the differential housing, and in the same direction. There are no high-speed parts in the assembly to dissipate engine horsepower, and the structure is as noiseless as any conventional single-speed rear axle drive. Any tendency of the ring gears to wobble while rotating is effectively eliminated due to the disposition and extent of the thrust areas provided in the structure, and particular attention is directed to the fact that the improved structure of this invention requires no greatly enlarged dimensions of the main housing. No adjustments of any kind are necessary within the housing. Moreover, the device is unitary and may therefore be incorporated in the housing with ease and dispatch.

As was previously pointed out herein, the operator of the vehicle is to manipulate the device of the invention, in an effortless manner. The manipulation required is that of shifting the plungers 60 in unison, irrespective of the number of plungers employed. This operation may be performed by purely mechanical means, or by the interposition of means electrical, hydraulic, or pneumatic, as desired.

In accordance with the disclosure of Figs. 1 and 2, the head 61 of each plunger has a notched or floating connection with a shifter collar 77 which may be reciprocated lengthwise of the hub 38 of the differential gear housing 17. Reciprocation of the collar may be effected by means of a shifter fork or the like 78 running in an annular groove 79 of the collar, said fork having a head 80 from which extends a rod or similar actuator 82 that projects outwardly through an aperture 81 of the main housing. Exteriorly of the main housing, the rod or actuator 82 may be connected to a flexible cable or other expedient for shifting the rod and the fork thereto attached. This shifting may be done manually, through the agency of any suitable mechanical, electrical, pneumatic or hydraulic means under the operator's control.

As detailed in Fig. 2, the shifter collar 77 has an extending circular flange 83 which at intervals along its periphery is provided with radial slots 84, the slots being equal in number to the number of plungers employed. The opposite parallel edges 85—85 of the slot are straight, and spaced apart a distance which is less than the diameter of the plunger head. To fit the head into the slot, the head may be milled or otherwise formed with transverse flats or channels 86—86 of such depth as to permit sliding the plunger head into the slot. The flats preclude turning of the plunger on its axis, while at the same time the plunger may shift slightly in all lateral directions to accommodate itself freely to the bores 35 and 68 of the gear mechanism. Thus, the plungers may be said to have a floating or swivel connection with the shifter collar 77. By reason of this type of connection, there is attained a uniform distribution of strains and stresses upon the plungers, so that each will assume its share of wear and shear imposed in the various positions of the plungers. The floating plungers also facilitate manufacture and assembly of the unit, as the fitting thereof into the bores 35, 68 and 69 is unhampered by any rigid connection with the shifter collar.

The central bore 88 of the collar 77 may be channeled as at 89 to accommodate the splines 39 of the housing hub 38, the advantages of this being to relieve the plungers of lateral forces imposed by the drag of the shifter fork upon the collar 77, and to shear away any heavy lubricant on the hub as the collar is shifted longitudinally thereon. In the absence of the spline connection 39—89, the shifter means is nevertheless operative since in any event the collar will rotate with the differential housing hub 38.

An alternative form of shifter collar and plunger mount is illustrated by Fig. 3, wherein 90 indicates the shifter collar which in all respects is similar to the collar 77 of Figs. 1 and 2, except for the omission of radial slots 84. The collar of Fig. 3 has a circular flange 91 with an uninterrupted peripheral edge 92 of uniform thickness, and loosely fitted to this edge is a block or segment 93 having an arcuate channel 94 formed in the inner face 96 to receive the flange edge. The head end of the plunger 60 may be welded or otherwise fixedly secured to one vertical side 95 of the block or segment, so that when the latter is applied to the flange, the plunger will extend at right angles to the flange. In practice, the plunger may be made integral with the segment 93, if desired.

In the construction illustrated by Fig. 3, the plunger and its segment or block 93 has a floating or self-adjusting connection with the shifter collar, resulting in the same adavntages as were related above in describing Fig. 2. The fitting of groove or channel 94 loosely to the periphery of the flange 91 permits the plunger to find a seat readily within the bores 35, 68 and 69, while at the same time the extensive contact area of the segmental groove or channel base upon the flange edge is very effective to preclude any perceptible turning of the plunger about its own axis. It should be obvious that such turning of the plunger is to be avoided, in order to ensure a proper disposition of the plunger face 64 favorable to idling rotation of the outer ring gear 25 relative to the differential housing 17. Any required number of segment and plunger units may be arranged upon the flange 91, in correspondency with the number of sets of plunger recesses provided in the ring gears, the housing flange 33, and the journal member 41. Adjacent segments or blocks 93 arranged upon the shifter collar flange preferably will not have endwise contact one with another, in order to preserve the floating character of the plungers.

Although in the illustrated embodiment of the invention the ring and pinion gears are conveniently shown with straight or spur teeth, these will in practice take the form of helical gears or gears having other forms of teeth which are well adapted for the service required in a vehicle axle drive. The disclosure also indicates conventional means of supporting the various shafts and gears with anti-friction bearings, wherefore it is to be understood that such structure is subject to modification within the skill of the designer. The same applies to the nuts 57 and 58 as a means to retain the inner ring gear. Various other modifications and changes in structural details may be resorted to, within the scope of the appended claims, without departing from the spirit of the invention.

What I claim is:

1. In a device of the character described, the combination of a power-rotatable propeller shaft, a pair of pinions fixedly mounted upon the propeller shaft for rotation therewith each in a fixed plane, a rotational bored housing including axle means rotatable with said housing, an outwardly directed perforate flange on the housing, means supporting said housing for rotation with the flange disposed always in a fixed plane, a pair of annular bearing areas on the housing, and a thrust bearing area adjacent to each of said annular bearing areas, a ring gear rotatable upon one of the annular bearing areas of the housing in abutment upon one of the thrust bearing areas, the teeth of the ring gear being in constant mesh with the teeth of one pinion, an inner notched flange on said ring gear, said notch being registerable with the bore of the housing and the perforation of the flange, a second ring gear rotatable upon the other annular bearing area of the housing, and having a back face provided with an opening to register with the housing bore aforesaid, said back face being slidable upon the other thrust bearing area of the housing, the teeth of said second ring gear meshing constantly with the teeth of the remaining pinion, a non-rotatable plunger having a head end, an opposed bolt end, and a notched intermediate portion, the notch providing at least one additional bolt portion intermediate the ends of the plunger, and the notch providing further a clear transverse passageway for movement of the first ring gear flange across the plunger, and actuating means at the head end of the plunger for selectively reciprocating the plunger to alternatively engage the bolt end thereof with the opening in the second ring gear, or to engage the intermediate bolt portion with the flange notch of the ring gear first mentioned.

2. In a device of the character described, the combination of a power-rotatable propeller shaft, a pair of pinions fixedly mounted upon the propeller shaft for rotation therewith each in a fixed plane, a rotational bored housing including axle means rotatable with said housing, an outwardly directed perforate flange on the housing, means supporting said housing for rotation with the flange disposed always in a fixed plane, a pair of annular bearing areas on the housing, and a thrust bearing area adjacent to each of said annular bearing areas, a ring gear rotatable upon one of the annular bearing areas of the housing, and in abutment upon one of the thrust bearing areas, the teeth of the ring gear being in constant mesh with the teeth of one pinion, an inner notched flange on said ring gear, said notch being registerable with the bore of the housing and the perforation of the flange, a second ring gear rotatable upon the other annular bearing area of the housing, and having a back face provided with an opening to register with the housing bore aforesaid, said back face being slidable upon the other thrust bearing area of the housing, the teeth of said second ring gear meshing constantly with the teeth of the remaining pinion, a non-rotatable plunger in the housing bore having a head end, an opposed bolt end, and a notched intermediate portion, the notch providing at least one additional bolt portion intermediate the ends of the plunger, and the notch providing further a clear transverse passageway for movement of the first ring gear flange across the plunger, and shifter means rotatable with the housing, including an axially shiftable collar and means thereon establishing a floating connection with the plunger head, for shifting said plunger axially in one direction to engage the bolt end thereof with the opening in the second ring gear, and in the opposite direction to engage the intermediate bolt portion with the flange notch of the ring gear first mentioned, said engagements being alternative.

3. A device in accordance with claim 2, characterized by the inclusion of means at the collar and plunger connection, precluding rotation of said plunger within the housing bore.

4. In a device of the class described, the combination of a power-rotatable propeller shaft, a pair of pinions fixedly mounted upon the propeller shaft for rotation therewith each in a fixed plane, a rotational bored housing including axle means rotatable with said housing, an outwardly directed perforate flange on the housing, means supporting said housing for rotation, with the flange disposed always in a fixed plane, a pair of annular bearing areas on the housing, a pair of ring gears each rotatable upon one of the bearing areas in parallelism, means on the housing precluding axial shifting of said ring gears, the ring gears each being in constant mesh with a pinion of the propeller shaft, plungers longitudinally shiftable within the bores of the housing and the perforations of the flange, a pair of bolt sections on each plunger, and means on each ring gear engageable with said bolt sections in alternation, as the plungers are shifted longitudinally in opposite directions, to lock the ring gears alternatively to the housing, a shifter controllable remotely from the housing, said shifter being displaceable axially of the ring gears and in the direction of plunger displacement, and means connecting the plungers to the shifter for enforcing shifting of the plungers in unison.

5. A device in accordance with claim 4, in which the connecting means for the plungers are flexible in directions transversely of the plunger axes.

6. A device according to claim 4, characterized by the fact that the bores of the housing through which the plungers move, are located between the two ring gears.

7. A motor vehicle differential assembly which comprises in combination, a rotatable hollow housing having an axial bore therein, and a plurality of plunger bores arranged about the housing axis in parallelism therewith and at equal distance therefrom, an outwardly extending flange on the housing having transverse perforations aligned with the plunger bores, a pair of annular bearing areas on the housing, a pair of ring gears each rotatable upon one of the bearing areas in parallelism, means on the housing precluding axial shifting of the ring gears, plungers longitudinally shiftable within the plunger bores of the housing and the perforations of the flange, a pair of bolt sections on each plunger, and means on each ring gear engageable with said bolt sections in alternation, as the plungers are shifted longitudinally in opposite directions, to lock the ring gears alternatively to the housing, a shifter controllable remotely from the housing, said shifter being displaceable axially of the ring gears and in the direction of plunger displacement, and means connecting the plungers to the shifter to enforce shifting of the plungers.

8. A motor vehicle differential assembly which comprises in combination, a rotatable hollow housing having an axial bore therein, and a plurality of plunger bores arranged about the housing axis in parallelism therewith and at equal distances therefrom, an outwardly extending flange on the housing having transverse perforations aligned with the plunger bores, a pair of annular bearing areas on the housing, a pair of ring gears each rotatable upon one of the bearing areas in parallelism, means on the housing precluding axial shifting of the ring gears, plungers longitudinally shiftable within the plunger bores of the housing and the perforations of the flange, a pair of bolt sections on each plunger, and means on each ring gear engageable with said bolt sections in alternation, as the plungers are shifted longitudinally in opposite directions, to lock the ring gears alternatively to the housing, a shifter controllable remotely from the housing, said shifter being displaceable axially of the ring gears and in the direction of plunger displacement, and means connecting the plungers to the shifter to enforce unitary shifting of the plungers, a pair of spaced differential gears rotatably supported within the hollow interior of the housing axially thereof, means for connecting a pair of axles to said gears for rotation therewith, and at least one idler gear in the housing meshing with said differential gears to transmit motion of one to the other.

9. A motor vehicle differential assembly which comprises in combination, a rotatable hollow housing having an axial bore therein, and a plurality of plunger bores arranged about the housing axis in parallelism therewith and at equal distances therefrom, an outwardly directed perforate flange on the housing, means for supporting said housing for rotation with the flange disposed always in a fixed plane, a pair of annular bearing areas on the housing, a pair of ring gears each rotatable upon one of the bearing areas in parallelism, means on the housing precluding axial shifting of the ring gears, an inner notched flange on one of said ring gears, said notches being registerable with the bores of the housing and the perforations of the flange, the second ring gear being rotatable upon the other annular bearing area of the housing, and having a back face provided with openings to register with the housing bores aforesaid, a non-rotatable plunger in each housing bore, each plunger having a head end, an opposed bolt end, and a notched intermediate portion, the notch providing at least one additional bolt portion intermediate the ends of the plunger, and the notch providing further a clear transverse passageway for movement of the first ring gear flange across the plunger, and shifter means rotatable with the housing, including an axially shiftable collar and means thereon establishing a floating connection with the plunger heads, for shifting said plungers axially in one direction to engage the bolt end of each plunger with an opening in the second ring gear, and in the opposite direction to engage the intermediate bolt portion with a flange notch of the ring gear first mentioned, said engagements being alternative.

10. A device in accordance with claim 9, characterized by the inclusion of means at the collar and plunger connections, precluding rotation of the plungers within the housing bores.

11. A motor vehicle differential assembly which comprises in combination, a rotatable hollow housing having an axial bore therein, and a plurality of plunger bores arranged about the housing axis in parallelism therewith and at equal distances therefrom, an outwardly extending flange on the housing having transverse perforations aligned with the plunger bores, a pair of annular bearing areas on the housing, a pair of ring gears each rotatable upon one of the bearing areas in parallelism, means precluding axial shifting of the ring gears, plungers longitudinally shiftable within the plunger bores of the housing and the perforations of the flange, a pair of bolt sections on each plunger, one of said bolt sections being at one end of a plunger, and the other bolt section being intermediate the plunger ends, a head on the remaining end of each plunger, means on each ring gear engageable with said bolt sections in alternation as the plungers are shifted longitudinally in opposite directions, to lock the ring gears alternatively to the housing, a shifter for the plungers comprising a centrally bored collar concentric with the axis of rotation of the housing and shiftable along said axis, the collar including a concentric outer flange extending approximately to the heads of the plungers, the plunger heads being arcuately channeled to loosely embrace the flange, each of said channels being of a length greater than the diameter of a plunger, and of an arcuacy substantially corresponding to that of the collar flange.

12. A device according to claim 11, wherein the shifter collar is splined to a portion of the rotatable housing, and means are included in the combination to shift the collar axially, said shifting means being remote from the differential assembly.

13. A motor vehicle differential assembly which comprises in combination, a power-rotatable propeller shaft, a pair of pinions fixedly mounted upon the propeller shaft for rotation therewith each in a fixed plane, a rotatable hollow housing having an axial bore therein, and a plurality of plunger bores in the housing arranged about the housing axis in parallelism therewith and at equal distances therefrom, an outwardly extending flange on the housing having transverse openings aligned with the plunger bores, a pair of annular bearing areas on the housing, a pair of ring gears each rotatable upon one of the bearing areas in parallelism, said ring gears each being in constant mesh with one of the propeller shaft pinions, means precluding shifting of the ring gears away from their respective pinions, plungers longitudinally shiftable within the plunger bores of the housing and the openings of the flange, a pair of bolt sections on each plunger, and means on each ring gear engageable with said bolt sections in alternation, as the plungers are shifted longitudinally in opposite directions, to lock the ring gears alternatively to the housing, a shifter displaceable axially of the ring gears and in the direction of the plunger movements, and means connecting the plungers to the shifter to enforce shifting of the plungers.

14. A device according to claim 13, wherein the connecting means between the shifter and the plungers involves a loose joint to avoid interference with free axial movements of the plungers.

References Cited in the file of this patent

UNITED STATES PATENTS

| Number | Name | Date |
|---|---|---|
| 648,286 | Overman et al. | Apr. 24, 1900 |
| 739,687 | Kupper et al. | Sept. 22, 1903 |
| 978,700 | Collins | Dec. 13, 1910 |
| 1,033,082 | Collins | July 23, 1912 |
| 1,033,083 | Collins | July 23, 1912 |
| 1,165,915 | Sparks | Dec. 28, 1915 |
| 1,470,961 | Creveling | Oct. 16, 1923 |
| 1,988,182 | Weiland | Jan. 15, 1935 |
| 2,454,685 | Avila | Nov. 23, 1948 |

FOREIGN PATENTS

| Number | Country | Date |
|---|---|---|
| 520,604 | France | Feb. 18, 1921 |